Aug. 4, 1970  J. D. YORK  3,523,230
STEPPING MOTOR POSITIONING SYSTEMS
Filed Nov. 8, 1968  4 Sheets-Sheet 1
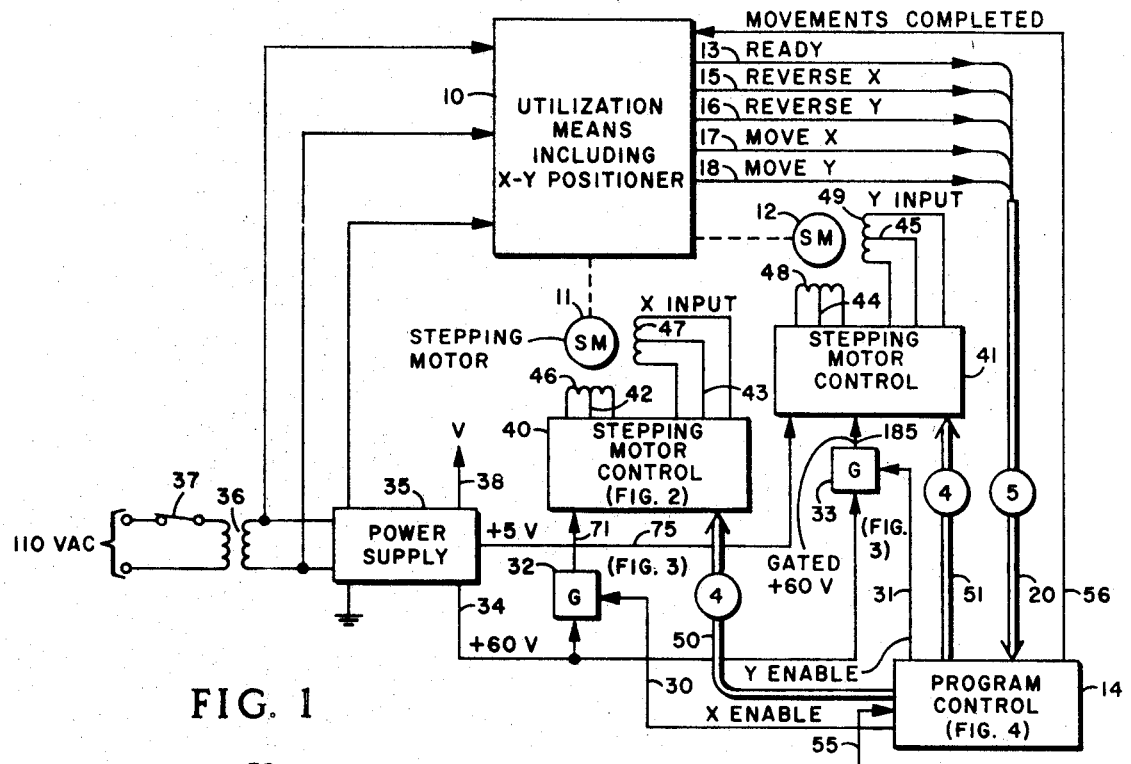
FIG. 1
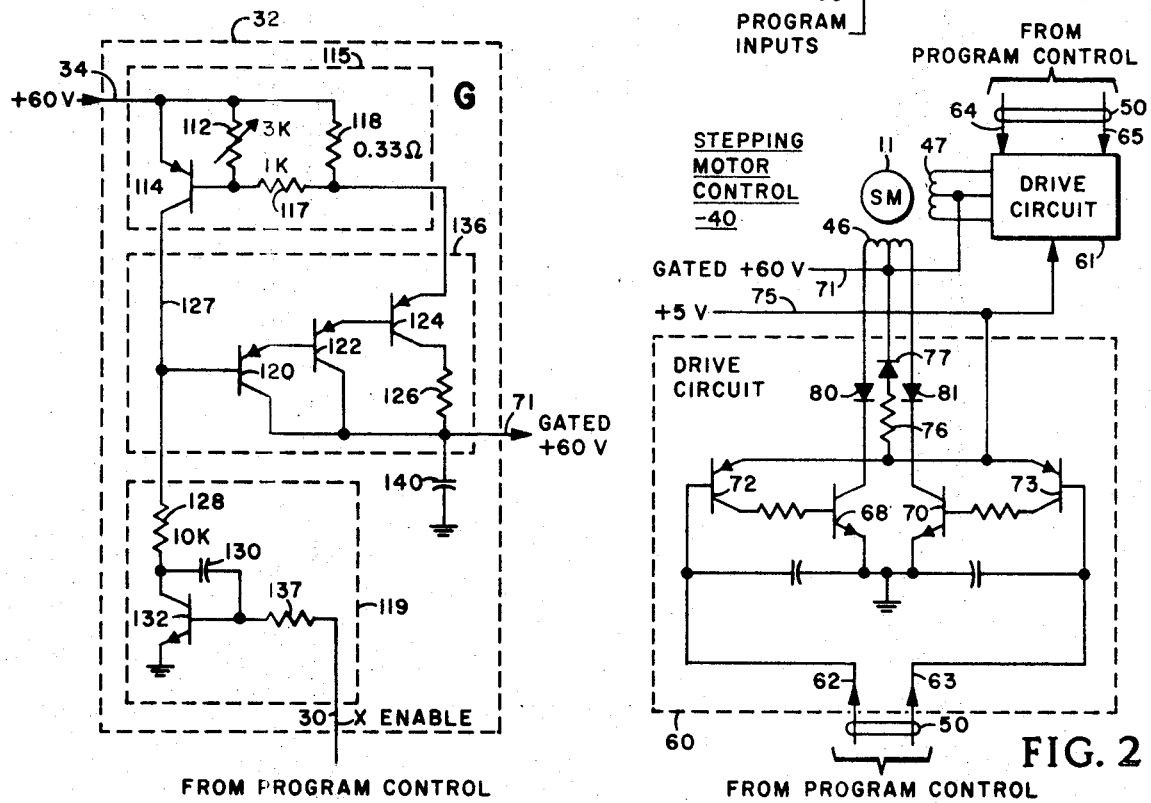
FIG. 3
FIG. 2
INVENTOR
JOE DEAN YORK
BY
Mueller, Aichele & Rauner
ATTORNEYS

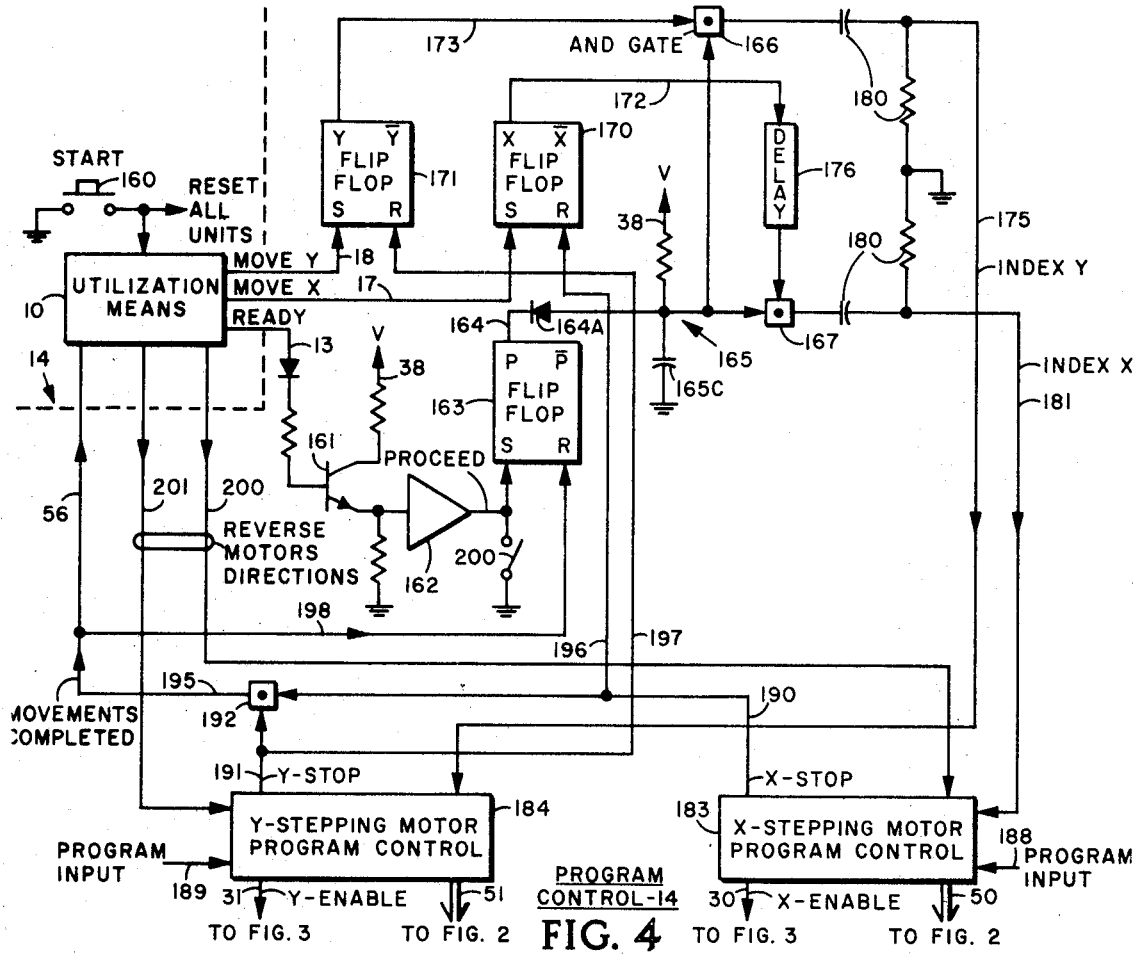
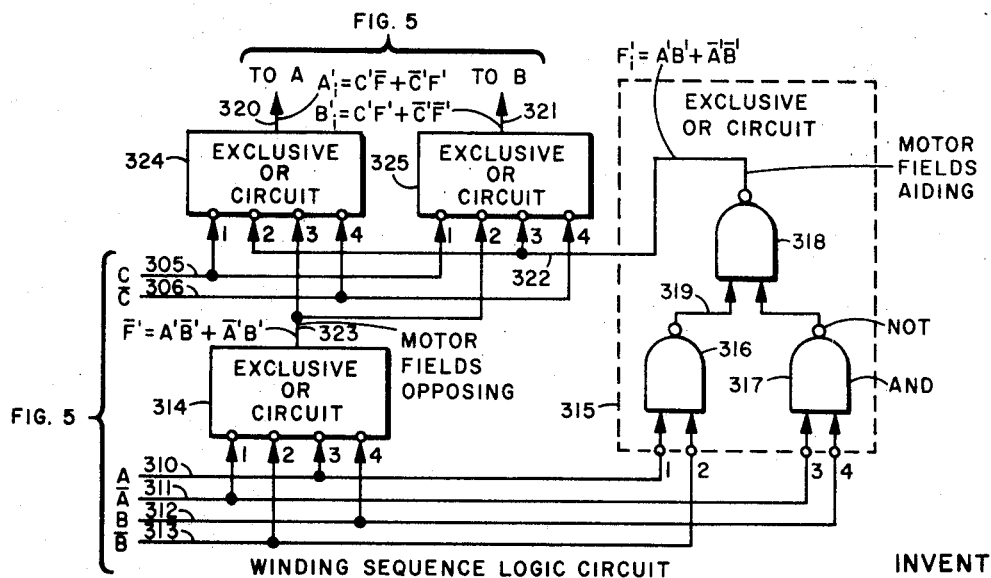

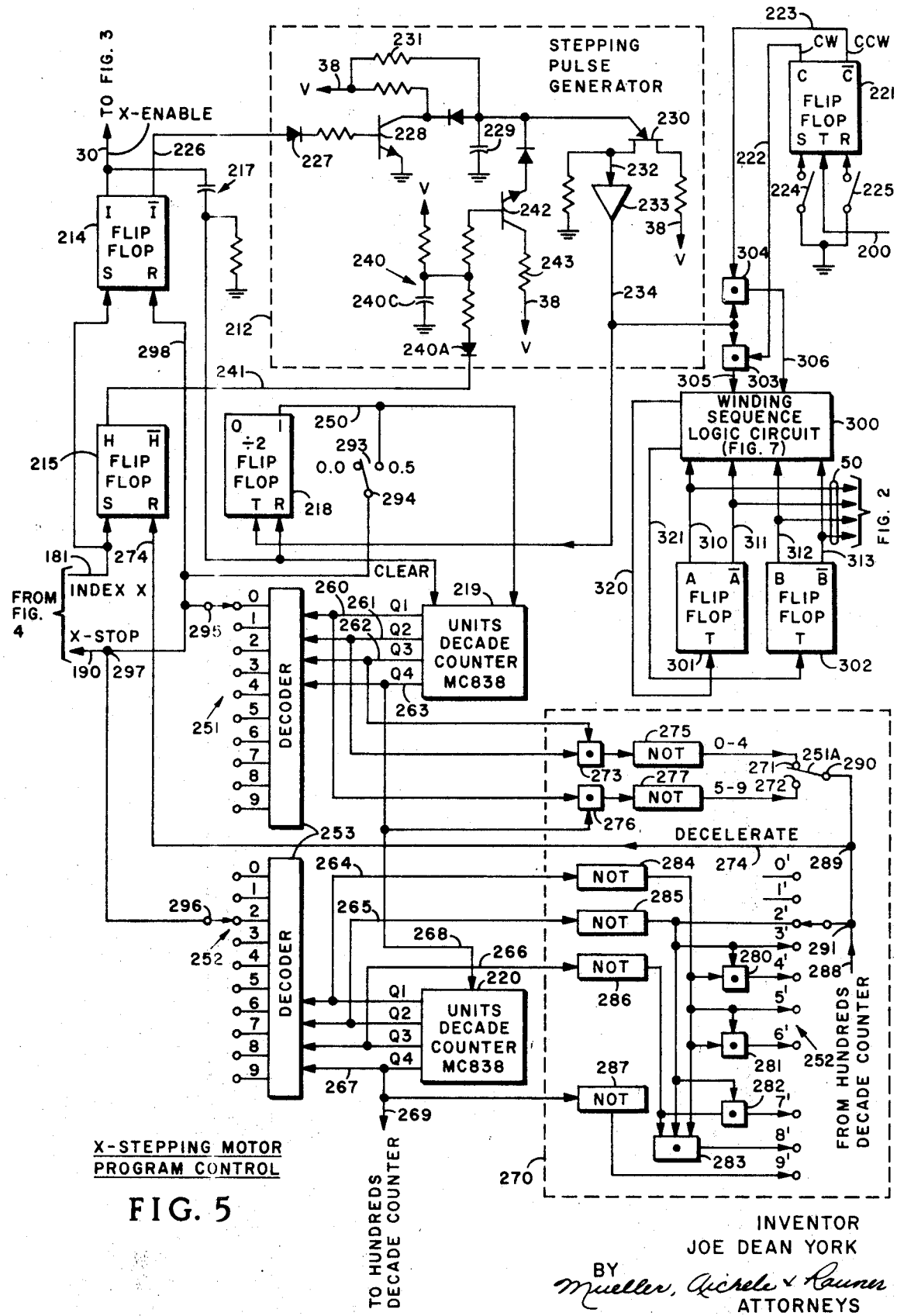

3,523,230
STEPPING MOTOR POSITIONING SYSTEMS
Joe Dean York, Scottsdale, Ariz., assignor to Motorola, Inc., Franklin Park, Ill., a corporation of Illinois
Filed Nov. 8, 1968, Ser. No. 774,304
Int. Cl. G05b 19/00; H02p 1/30, 1/56
U.S. Cl. 318—603        4 Claims

ABSTRACT OF THE DISCLOSURE

A stepping motor actuated X–Y positioner provides relative movements between function performing unit and a unit on which a function is to be performed. Each stepping motor is rapidly actuated by semiconductor switching devices. When a stepping motor winding is deactuated, the flyback voltage is permitted to increase to a high amplitude to minimize time for the magnetic field to collapse. When positioning movements are desired, a gated high voltage is supplied to the windings for actuating same. When the motors are stationary, small amplitude holding current is supplied through the stepping motor winding means and the semiconductor switching devices for maintaining the stepping motor in a predetermined position. A program control determines when the stepping motors have positioned the X–Y positioner to a desired location. A multifrequency oscillator supplies low frequency stepping pulses at a low rate upon the initiation of a positioning movement and high frequency stepping pulses in the mid-portion of a positioning movement. Each stepping motor is decelerated prior to reaching a desired location.

BACKGROUND OF THE INVENTION

This invention relates to actuating stepper or stepping motors, particularly for stepping motors usable for making precise positioning movements at high speeds.

The stepper or stepping motor has been used as a source of power for combining precise incremental rotation with good acceleration and power. These motors are usable for controlling and making precise microminiature positioning movements. Such movements are typically 0.0005 inch per step. Such a motor is shown and described in U.S. Pat. 2,931,929. Stepping motors are also useful for making larger positioning movements. Stepping motors are similar to continuously rotating motors in that the changing magnetic field condition induces power in the rotor for causing the rotor to rotate. A difference is that the rotor in the stepper motor includes a permanent magnet. When the magnetic field of the stator is caused to move by changing the direction and magnitude of current in the various stator windings, the permanent magnetic rotor aligns itself with this new field. The electrical current flowing in the windings are switched on and off to cause such changes. Rapidly switched currents cause the magnetic field to change suddenly which induces a rapid short predetermined rotor movement, thereby the name "stepper motor." Some stepper motors, for example, may move 1.8° per step. While to the human senses it appears that the rotor moves quickly, there is actually a period of acceleration, a period of deceleration, and a short period of oscillation about the new rotor position. At a current amplitude of 1.5 amperes per winding a commercially available stepper motor took about two milliseconds to move one step; then with no further current change, i.e., the 1.5 ampere current is still flowing through the winding, such motor took about 10 milliseconds to settle down to stable position at the new rotor position. If the stator switching action of the currents would again change before the rotor had reached its new 1 Y aligned position in a stable manner, the rotor would not accurately follow the changing magnetic fields, that is may stall or assume some alignment other than the desired one. Therefore, in stepping motors it is necessary to ensure that the rate of switching electrical currents in the stator windings is sufficiently slow for the rotor to precisely follow them. The manner of switching the currents, the collapse of the magnetic field after a current has been removed from a winding have a material affect on the response of a stepper motor.

The ability of the rotor to follow the stator field is proportional to the intensity of the magnetic field, which in turn depends upon a current amplitude in the windings. One way to attempt faster switching rates in stepper motors is to increase the winding current amplitude. The inductance of the windings limits this increase provided a higher voltage across the winding was used to obtain rapid increase in current amplitude. For example, it may be desired to increase the current from 0 to 1.5 amperes in less than two milliseconds. Some stepper motors will get overheated under such operating conditions. To prevent overheating a series resistance is inserted between the source of electrical current and the winding. Such techniques have been recommended by motor manufacturers. For example, in a motor described in the above-referred to patent, a 60 volt supply, a series resistance of 40 ohms was necessary for each winding to limit the current to 1.5 amperes. The initial increase current amplitude was 12 times as fast as that increase provided by a 5 volt supply. But as the winding current amplitude increases, the voltage across the winding decreases. The result in current vs. time is logogrammatic approaching the limiting value of current asymptotically. Therefore, in one time constant (LR) of the winding actuation circuit, the current amplitude of the electrical current flowing through the winding will have reached only $(e-1)/e$ of the final 1.5 ampere value or approximately 1 ampere. If the series resistance could be eliminated, at least a 50% faster response of the stepper motor could be obtained. This improvement indicates the need for constant-current variable-voltage supply. On the other hand, for a given response of the stepper motor, an electronically current limited system would require about two-thirds as large a power supply if the series resistor were eliminated.

Increasing the current amplitude in a rapid manner is half the problem of rapidly operating stepper motors. The other half of the problem is quickly stopping the current flow in the winding after turn off, i.e., cause the magnetic field to rapidly collapse.

The inductance of the winding tends to preserve the rate of current flow. In a loop circuit including that winding, the current will circulate for considerable time and the resultant magnetic field will be maintained in proportionate time. This causes the rotor to oscillate around the desired position. Since the quantity of magnetic and electric energy in the winding to be dissipated is the product of current amplitude and the inductance, the time for decay is inversely proportional to the reactive voltage generated by the inductor (winding). In a constant current or a current limited actuating system, the current amplitude at the initiation of the magnetic field decay period is the same for each repeated initiation. By permitting the reactive (flyback) voltage to increase several times the value of the inducing voltage, the decay time of the magnetic field is substantially reduced, such reduced decay time permits a stepper motor to rapidly stably reach its desired position, thereby permitting a faster stepper motor operation.

Such stepper motors are useful in X–Y positioners wherein they are directly connected to a screw type of drive an orthogonal axis. By stepping both motors simultaneously both X and Y positioning movements are achieved. It is also desirable in such positioning devices to minimize the positioning time. However, if the stepper motor is operated at high speed and then stopped quickly, it has a tendency to overshoot and then oscillate about the desired position. Such action limits the speed of the stepper motor to make a rapid succession of precise steps.

SUMMARY OF THE INVENTION

It is an object of the present invention to provide a rapidly operating stepper motor system capable of making precise steps.

It is another object of this invention to provide stepping motor positioning systems having low power consumption.

It is another object of the present invention to provide a rapidly operating stepper motor system of high speed which does not hunt about the desired position upon reaching such desired position.

A feature of the invention is the provision of a high voltage supply being gated on and off to a stepping motor winding such that the high voltage is supplied only during the period of time the stepping motor is positioning and is turned off whenever the stepping motor has reached a desired position.

Another feature of the present invention is the supplying of stepping pulses to stepping motors at a low rate immediately after initiation of position movement, then supplying stepping pulses at a greatly increased rate until a selected small number of stepping pulses before the stepping motor reaches the desired position at which time the stepping pulse rate is reduced to the initial rate such that the stepping motor does not travel beyond the desired position. For rapid positioning movements, it is desired that the present invention use the following described stepping motor control: A pair of semiconductor switching devices, such as transistors, silicon controlled rectifiers and the like, connected through a pair of unidirectional current conducting devices, such as crystal, diodes, respectively to opposing ends of a center-tapped stepper motor winding. Such winding center taps are connected to a gated high-voltage limited-current supply. As the semiconductor switching devices are switched between conduction and nonconduction, current flows alternately from the center tap connection through the opposite ends to thereby cause the stepper motor to rotate in one of two directions. When current flowing through a winding is turned off, the resultant flyback voltage induced in the winding is permitted to reach high amplitudes to reduce decay time. A unidirectional current conducting device is electrically interposed between the winding and the semiconductor switching device; thereby electrically isolating the semiconductor switch from the winding flyback voltage. This prevents the flyback voltage from drawing current caused in the semiconductor switch by the injection of minority carriers into the winding to thereby reduce the flyback voltage dissipation time. The breakdown voltage, $BV_{CEO}$, of the semiconductor switching devices are a limitation on the maximum permissible flyback voltage amplitude.

The above-described stepper motor control circuit is provided for each winding of each stepper motor. It is common that stepper motors will have two such center tap windings or four independent windings. For the stepper motor to be rotated clockwise or counterclockwise, the windings are selectively actuated and deactuated in a predetermined sequence in accordance with the stepper motor design. Logic circuits are connected to the control electrodes of the semiconductor switching devices for sequencing such switches on and off to thereby sequence the currents through the stepper motors winding in the desired manner.

The stepper motor control circuit has a further connection to a low voltage supply. The low voltage supply is connected to the center tap of each of the stepper motor windings through a current limiting resistor and a unidirectional current conducting device poled to conduct current in the direction of current flow through the presently conductive semiconductor switching device. When the high voltage is supplied to the center tap of the stepper motor winding for actuating the motor for rotation, the unidirectional current conducting device in the low voltage supply is reversed biased for isolating the low voltage supply from the winding. When the stepper motor is stopped, the high voltage supply is gated off thereby permitting the low voltage supply to supply voltage through the windings to positively hold the stepper motor in a desired position. This reduced voltage supply reduces the power dissipation within the stepping motor. It is understood that other control circuits may be successfully used with the present invention. In accordance with this invention, a positioning system either a meno- or-multi coordinate system incorporating the stepping motor control circuit as described above, includes a program control which predetermines the number of steps each stepper motor takes for each positioning movement. Movements along each coordinate are independently controlled. The number of pulses supplied to the respective stepper motors are counted and compared with the number of pulses required to cause the respective motors to reach a desired location. When the correct number of pulses have been supplied, a comparator emits a signal to stop the stepper motor. Just prior to stopping, the comparator supplies a second signal indicating that the stepper motor is to be decelerated.

For each coordinate of movement, variable frequency pulses are supplied by a multi-frequency pulse generator, such as a unijunction transistor having an RC charging circuit on its control electrode. Upon initiation of a positioning movement in a given coordinate, an RC circuit having a given time constant is connected to a voltage source for causing the unijunction transistor to supply pulses at a slow rate, such as 500 p.p.s. (pulses per second). The pulse repetitive frequency is increased until after a predetermined time delay, for example, the supplying of six stepping pulses, the pulse repetitive frequency is at a higher rate (such as 3000 p.p.s.) to thereby increase the speed of the stepper motor. Upon receipt of the second signal from the comparator, indicating that the motor is to be decelerated, the pulse repetitive frequency is reduced to the initial repetitive frequency. Other multi-frequency oscillators pulse generators may be used, such as voltage controlled oscillators and the like.

THE DRAWINGS

FIG. 1 is a block diagram of an X–Y positioning system incorporating the teachings of the present invention.

FIG. 2 is a schematic diagram of a stepping motor control circuit used to selectively actuate the windings in the stepping motor of the FIG. 1 illustrated system.

FIG. 3 is a schematic diagram of a power gating circuit utilized in the FIG. 1 illustrated system used to selectively supply a stepping motor actuating voltage to windings of one stepping motor.

FIG. 4 is a block diagram of a program control used to sequence and time the operation of the FIG. 1 illustrated system and the interconnections to a utilization means.

FIG. 5 is a block diagram of an X-motor program control usable in the $F_y4$ illustrated program control.

FIG. 7 is a block diagram of a winding sequence logic circuit used in the FIG. 5 illustrated X-motor program control for controlling the windings on the X-drive stepping motor.

DETAILED DESCRIPTION OF THE ILLUSTRATIVE EMBODIMENT

Figure 6:
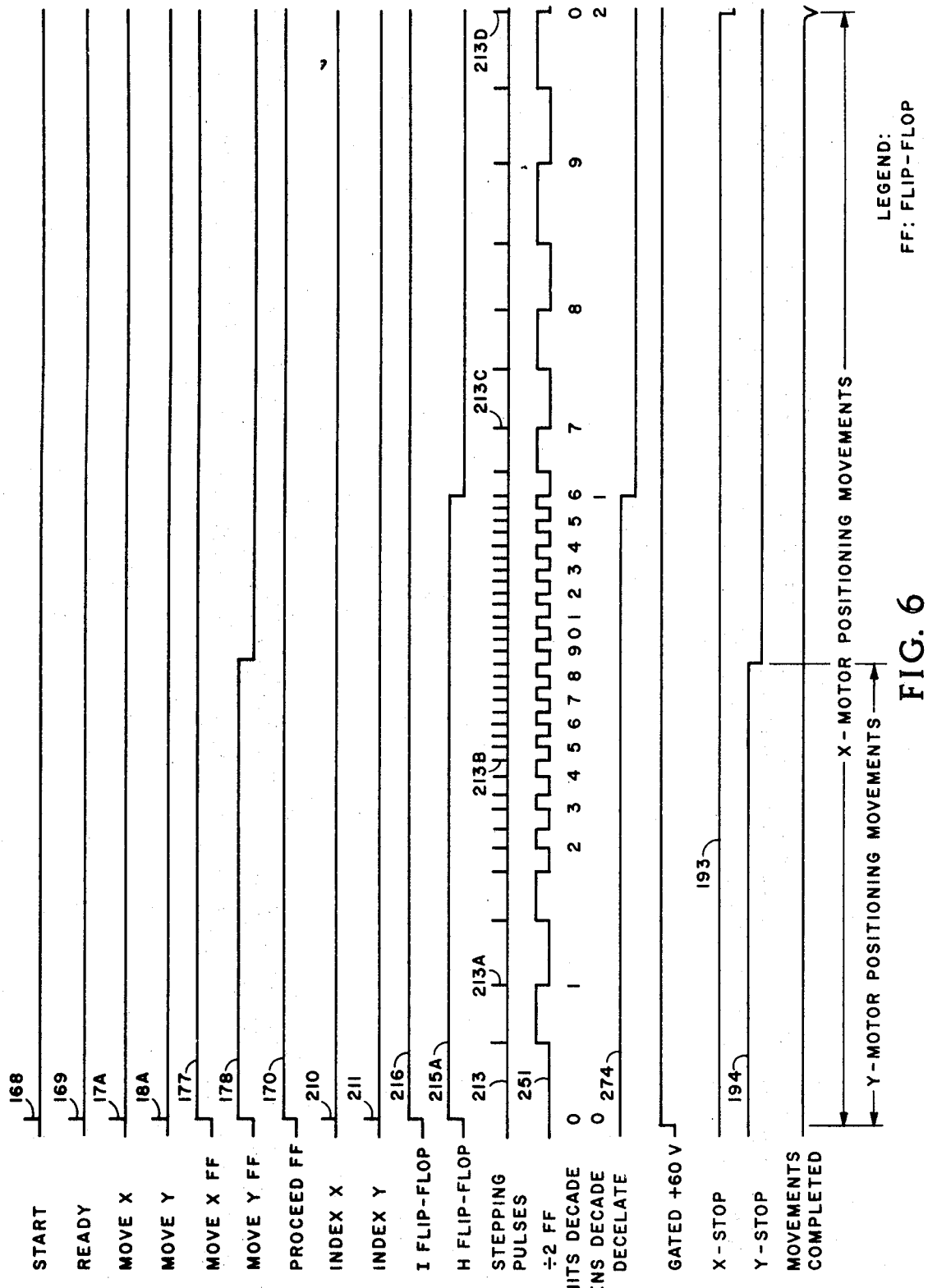
FIG. 6 is a chart of idealized wave forms illustrating the operation of the FIGS. 4 and 5 program controls.

Referring now more particularly to the drawing, like numbers indicate like parts and structural features in the various diagrams to facilitate reading. The description is divided into major functionally related sections.

GENERAL DESCRIPTION

Referring particularly to FIG. 1, utilization means 10, including an X-Y positioner receives positioning movements from the two stepper motors 11 and 12 respectively in X and Y coordinates. Signals are exchanged between utilization means 10 and program control 14 of the positioning system as will be fully described. The utilization means positioned by the X-Y positioning system (not shown) may be a chart recorder wherein the pen is stationed in the X-Y coordinated by stepper motors, a test probe for testing parts of a circuit wherein the circuit or the probe is positioned in X and Y plus a vertical movement between the probe and the circuit to make an electrical contact to thereby test a portion of the circuit, wire bonders, die bonders, schematic diagram writing mechanisms, map making machines or any other function performing means which may use a positioner. Several types of utilization means operable with X-Y positioners are well known and are not illustrated for that reason. Such known positioning devices are known to provide control signals and are responsive to control signals for performing positioning and operational functions. For example, when a utilization means, such as a test probe, is in position to be moved to the next test location, it supplies a ready signal over line 13 to program control 14 of the positioning mechanism. This ready signal indicates to program control 14 that it should initiate positioning movements. Reverse X and reverse Y signals respectively on line 15 and 16 indicate to program control 14 that the previous direction of movement effected should be reversed because the desired position is in the opposite direction to the previous movement. In the alternative, the detection or determination of the direction of movement, i.e., whether it should be continued in the same direction or reversed, may be made by a program control. Such function of the program control has not been illustrated because it is contemplated that the utilization means may more effectively make this determination. As is referred to in the section entitled "X Stepping Motor Program Control," utilization means 10 also supplies signals, "move-X" and "move-Y" respectively over lines 17 and 18 to indicate that positioning movements in the X coordinate or the Y coordinate are desired. For simplicity, the lines 13 through 18 are shown as cable 20 consisting of five signal paths leading to program control 14. Upon receiving the above-identified signals, program control 14 supplies gate opening or enabling signals over lines 30 and 31 respectively to power gates 32 and 33. Gates 32 and 33 receive plus 60 volts (+60 v.) over line 34 from DC power supply 35. Power supply 35 receives a 110 volt alternating current signal through transformer 36 and closed on-off switch 37. Power supply 35 also supplies a logic circuit operating voltage over line 38. For clarifying the presentation, the connections of line 38 to the various logic circuits later described is not shown, such connections are well known.

The power gates 32 and 33 being opened pass the +60 v. as gated 60 volts (gated +60 v.) to stepping motor control circuits 40 and 41, respectively. This gated +60 v. is then supplied over lines 42, 43, 44 and 45 to the center tap connections of windings on the stepping motors 11 and 12 and, respectively denoted by numerals 46, 47, 48 and 49. The construction of stepping motors 11 and 12 with the two center-tapped windings or four separate windings joined as center-tapped windings is in accordance with the patent referred to in the "background of the invention." It is understood, of course, that other stepping motors may be utilized in the successful practice of this invention. The opposite ends of each of the stepping motor windings 46 through 49 are connected to semiconductor switching devices within the stepping motor control circuits 40 and 41 and are successively actuated in accordance with control signals received from program control 14 respectively over the four signal path cables 50 and 51. Each signal path in the respective cables 50 and 51 carry signals for causing a conductive path to be completed at one of the two ends of the windings in the stepping motor for causing current flow in opposite directions in the various windings.

Program control 14 includes pulse generating means which supplies stepping pulses over cables 50 and 51 to cause motors 11 and 12 to step clockwise or counterclockwise in accordance with the desired direction of movement indicated by the signals on lines 15 and 16. The number of steps for the respective X and Y directions are supplied through program input portion 55 which presets memory-elements in program control 14 indicating the number of steps to be effected for each request for movement indicated by the ready signal on line 13 and the "move-X" and "move-Y" signals. When program control 14 has sensed that both the X and Y positioning movements have been completed, it then supplies a "movement's completed" signal over line 56 to utilization means 10. Upon receipt of the movement's completed signal, utilization means 10 then performs a function in accordance with preprogramming therein, such as lowering a test probe to a semiconductor wafer contact to test the characteristics thereof, generate a character for recording on a chart, make a dot on a chart and so forth. It is understood that the program inputs on program input portion 55 of program control 14 may be manually inserted, such as used in the illustrated embodiment, may be punched paper tape, magnetic tape, may be received from a data processing unit or from a common controller utilized to control the positioning system and the operation of the utilization means 10, or any other source suitable for providing programmed positioning inputs. It is also understood that successive movements in the X direction may be identical, as provided by a manual input; or successive movements may be in accordance with a preprogrammed change, i.e., the first movement may require twenty steps, the second fifty and the third twenty and then the cycle being repeated. It is also understood that the program inputs may require a random number of steps in accordance with phenomena being sensed by a unit (not shown) such that a function may be performed by utilization means 10 in accordance with the phenomena being sensed. As an example, adjusting a controller in a process control system.

The general description includes the utilization means having an X-Y positioner, no limitation thereto is intended. Utilization means may only have a single positioner, i.e., may utilize a rotational positioning device such as a shaft position indicator. It also may include three dimensions or may be a plurality of X-Y positioning systems, all cooperating together to perform a complex function on a production line or in an indicating system.

STEPPING MOTOR CONTROL CIRCUITS

Referring now to FIG. 2, the detailed construction of stepping motor control 40 of the X stepping motor 11 is described. It is understood that the construction of stepping motor control 41 is identical to the circuit configuration illustrated in FIG. 2. Stepping motor control 40 includes first and second drive circuits 60 and 61. Drive circuit 60 actuates the center-tapped winding 46 while drive circuit 61 actuates center-tapped winding 47 in a particular sequence to cause stepper motor 11 to rotate either in a clockwise or counterclockwise direction. Signal paths 62 and 63 are connected to drive circuit 60 while signal paths 64 and 65 are connected to drive circuit 61. Drive circuit 60 has a pair of semiconductor switching devices 68 and 70, shown as transistors, having their collectors respectively connected to opposing ends of motor winding 46. The center-tap connection of winding 46 is connected to line 71 which carries the gated +60 v. from gate 32. Signal paths 62 and 63 are coupled to the base electrodes of switching devices 68 and 70 through control transistors 72 and 73. The arrangement is such that whenever a transistor actuating signal is supplied over signal path 62, a corresponding transistor deactuating signal is supplied over signal path 63, and vice versa. In this manner, one and only one of the semiconductor switching devices 68 and 70 are conductive at one time. Also when one is switched to nonconduction, the other is switched to current conduction. A later described flip-flop is used to supply such signals actuating and deactuating.

In the illustrated embodiment, a relative negative or low voltage supplied over line 62 causes the control transistor 72 to become current conductive, thereby supplying base drive to semiconductive switching device 68 making it highly conductive. Simultaneously therewith, a relatively positive voltage is supplied over line 63 to control transistor 73 making it nonconductive to remove the base drive current from semiconductor switching device 70, thereby making it electrically nonconductive. With this arrangement, current will flow from line 71 to the center-tap connection of winding 46, thence in one of two directions as determined by the conductivities of the semiconductor switching devices 68 and 70 to selectively provide magnetic fields in motor 11 of a given polarity. By repetitively changing the signals on lines 62 through 65 inclusive and thereby successively reversing the magnetic fields in motor 11 with respect to the permanent magnet rotor, repetitive stepping operations are effected.

When motor 11 has arrived at a desired position, power gate 32 is closed removing the gated +60 v. signal from line 71. It is desired to have a magnetic field produced by windings 46 and 47 to be continued to ensure that the rotor of motor 11 precisely maintains itself in the desired position. To this end, a +5 v. potential is supplied over line 75 to both stepping motor controls 40 and 41. The +5 v. also is the power supply voltage for the control transistors 72 and 73. The holding current is amplitude limited by resistor 76. Diode 77 is electrically interposed between the center-tap connection of winding 46 (as well as line 71) and resistor 76. The diode or unidirectional current conducting device 77 is poled such as to conduct current between the supply line 75 and the winding 46 only when the potential on line 71 has been removed. Other times it is reverse biased to prevent a much higher voltage used in stepping the motor 11 on line 71 from reaching line 75. This arrangement reduces the power dissipation in motor 11 while it is not being stepped. It is understood that the +60 v. on line 71 could be left to provide a holding field in motor 11. However, large current amplitudes are involved which, of course, means power loss within the motor causing it to heat up. By supplying a relatively low voltage, such as +5 v., over line 75 to the windings 46 and 47 to thereby supply a low amplitude holding current through one of the switching devices in the drive circuit, sufficient magnetic fields are generated to keep motor 11 accurately maintained in a desired position. When it is again desired to step the motor to move to a new position, gates 32 and 33 are again enabled to supply the gated +60 v. to the center-tap connections of the various motor windings, thereby reverse biasing the various unidirectional current conducting devices 77.

During the repetitive stepping operations, while motor 11 is stepping toward a desired position, the semiconductor switching devices 68 and 70 are repetitively switched between high current conduction and current nonconduction. When such a semiconductor switching device is switched from current conduction to current nonconduction, there is so-called storage of minority carriers within the device. Such storage of minority carriers has to be removed from the switching device before it truly can reach current nonconduction. Removal of such minority carries appears as an electrical current within the circuit after the semiconductive switching device has been turned off by a signal at its control or base electrode. This added current can be caused to flow through the motor winding 46 by the flyback voltage referred to in the BACKGROUND OF THE INVENTION. This current tends to maintain the magnetic field in the winding thereby preventing fast reversals of the magnetic field so necessary to rapid and precise stepping operations. To prevent such lagging current unidirectional current conducting devices or diodes 80 and 81 are electrically interposed between the opposite ends of the center-tap winding 46 and the collector electrodes of the semiconductor switching devices or transistors 68 and 70. The two diodes are poled to conduct current in the direction normally expected when the semiconductor switches 68 and 70 are current conductive and to block any current flow in the opposing direction. Therefore, by such interposition of diodes, the flyback voltage induced in the winding 46 is not severely limited. Also note that the winding 46 center-tap actually creates two windings respectively between the opposing ends thereof and the center-tap connection. Such windings are bifilar, i.e., are inductively coupled together. Therefore, as the semiconductor switch 68 becoming current conductive starts to draw current from line 71 to its half of winding 46, there is a corresponding voltage induced in the other half of winding 46 connected to diode 81. Also, the opposing ends of winding 46 are relatively positive and negative with respect to ground an equal amount. Because of the low impedance of the device being switched on, i.e., device 68, without the diodes the voltage across the winding would be limited. Thereby, the diodes permit both ends of the winding to have voltage excursion several times the amount of applied voltage to thereby reduce the decay time of the magnetic field to a small fraction of the switching time. The limit to the voltage swing in winding 46 is determined by the collector-to-emitter breakdown voltage of the semiconductor switching devices 68 and 70 and of diodes 80 and 81. By making this value of the breakdown voltage high, energy stored in the winding-inductive is permitted to be dissipated quickly up to the Zener breakdown of such devices.

THE POWER GATES 32 AND 33

Both power gates 32 and 33 may be constructed identically. The gates perform three functions: gating power on and off, limiting the amplitude of the current being passed, and dissipation of carrying power within the gate. These three functions are necessary because of the varying load presented by the motor windings as the motor is stepped by magnetic field reversal caused by current switching effected by controls 40 and 41. FIG. 3 illustrates gate 32 which is best understood as having three parts, a current sensing amplifier 115, a current switch and power dissipation circuit 136 and circuit control 119. These three parts cooperate to perform the three functions mentioned above. Control 119 is electrically switched on and off by the X-enable signal on line 30 for respectively passing and blocking limited amplitude currents through circuits 40, 41, and thence windings 46 and 47.

In current sensing amplifier 115 the emitter electrode of the current sensing transistor 114 and current sensing resistor 118 receive current at +60 v. over line 34 from power supply 35. Variable resistor 112 is in parallel circuit relation to low-impedance current sensing resistor 118. The resistor 112 has an electrical impedance much greater than the impedance of resistor 118; for example, resistor 112 may be variable from one kilohm to three kilohms, while resistor 118 has an impedance of 0.33 ohm. Therefore, large adjustments of variable resistor 112 provide a fine adjustment of the electrical impedance across resistor 118. Resistor 117 is a base current limiting resistor for transistor 114 and may have an impedance of one kilohm. Other equivalent resistive networks may be used to provide the later described current amplitude responsive biasing of transistor 114 to accomplish current amplitude limiting.

The current switch and power dissipating circuit 136 has three resistors 120, 122, and 124 and power dissipating resistor 126. Transistors 120 and 122 are connected in the well known Darlington configuration with the emitter electrode of transistor 120 connected to the base electrode of transistor 122. The Darlington connected transistors 120 and 122 are considered as one semiconductor amplifier unit with most of the power dissipation being in transistor 122. Transistor 124 is used to switch current flow between power dissipating resistor 126 and transistors 120, 122 in accordance with the base drive supplied to transistor 124 at its base electrode. Under normal current limiting operations, transistor 124 is operated at collector current saturation. At small amplitudes of load current, i.e., those amplitudes well below the predetermined upper amplitude limit, transistor 124 may operate at less than collector current saturation.

Line 71 is connected to the collectors of transistors 122, 124 and through power dissipating resistor 126 to the collector electrode of transistor 124. The emitter electrode of transistor 124 receives current from amplifier 115. When power dissipation in circuit 136 is low, i.e., motor 11 is presenting a high impedance, most current flows from the emitter of transistor 124 through transistor 122 via the base electrode of transistor 124. At high power dissipation in circuit 38, i.e., motor 11 winding impedance is low, current is shifted from transistor 122 to flow through resistor 126 via the collector electrode of transistor 124. The base of transistor 120 receives control signals from control circuit 119 over line 127 to control circuit 136 operation as will be fully described with respect to circuit 119.

Control 119 is a Miller integrator circuit including transistor 132 and integrating capacitor 130. Operation of such an integrator circuit is well understood and will not be described. The base electrode of transistor 132 is connected through limiting resistor 137 to line 30. The collector of transistor 132 is connected through the collector load resistor 128 to the base electrode of transistor 120 and to the collector electrode of transistor 114.

Circuit 136 is gated on to conduct current in response to a positive X-enable signal on line 30. Transistor 132 becomes current conductive. The voltage on its collector electrode approaches ground reference potential causing transistors 120, 122 to be biased to current conduction. This action supplies a base drive current to transistor 124, effecting current flow between lines 34 and line 71.

Current switch 136 is opened to block current flow by the receipt of a negative X-enable signal on line 30 to make transistor 132 current nonconductive. This action makes the voltage on line 127 positive to bias transistors 120, 122 to current nonconduction thereby making transistor 124 nonconductive. As is well known, capacitor 130 delays the turn off of transistor 132 a short time. Such a delay is not necessary to the successful practice of this invention. Such delay was utilized in the illustrative embodiment to ensure the completion of the last step of stepping motor 11 as it reached a newly desired position.

Upon current being supplied, the current amplitude limiting function begins. Since sense resistor 118 has a very small impedance, (for example, 0.33 ohm) the voltage on line 127 is approximately the voltage on line 34 less the nearly constant base-to-emitter voltage drops of transistors 120, 122, and 124, which, of course, determines the voltage drop between the emitter and collector electrodes of transistor 114. Therefore, during the supplying of current motor 11 windings, line 27 tends to remain at a constant potential even though the amplitude of current through transistors 114, 120, 122 and 124 changes. That is, as the winding impedance decreases, the amplitude of current flowing through current sensing resistor 118 increases by a small amount. If current flowing through the current sensing resistor 118 is sufficient to bias transistor 114 to current conduction, the increase in voltage drop across resistor 118 further increases the conductivity of transistor 114. This action causes more current to flow from transistor 114 through resistor 128. But, because of the constant voltage drop (therefore a constant current flow) across resistor 128, when the amplitude of current from transistor 114 increases, the amplitude of current flowing through base electrode of transistor 120 decreases a corresponding amount. As this latter current amplitude decreases, there is a resulting decrease in conductivity of transistors 120 and 122 and thence transistor 124 thereby limiting the amplitude of current flow over line 71 in accordance with the inverse of the impedance of resistor 118. That is, the greater the electrical impedance of resistor 118, the lower the maximum amplitude of current flow over line 71. Of course, the electrical parameters of transistors 114, 120, 122 and 124 also have an effect on the maximum current amplitude. By adjusting variable resistor 112, the maximum current amplitude can be adjusted within a limited range to permit the use of a 10% tolerance resistor rather than a precision (1%) resistor for resistor 118. This arrangement reduces cost and provides adjustment flexibility.

When supplying a maximum current amplitude over line 71 to the windings having a time varying impedance because of switching action, power dissipation in the power gates varies on the same time basis and must be accommodated. As the value of the winding impedance decreases, the voltage on line 71 decreases causing a corresponding increase in voltage drop across the power gates between lines 34 and 71. This increased voltage drop largely appears across dissipation circuit 136.

The accommodation of such varied power dissipation is described with respect to a decreasing load impedance. Current switch and dissipation circuit 136 is responsive to an increasing voltage drop thereacross to increase current flow through resistor 126 and decrease current flow through transistors 120, 122. At winding dynamic impedance greater than resistor 26 resistance (voltage drop across circuit 136 is small) transistors 120; 122 dissipate a major portion of the power dissipated in circuit 136. When the winding dynamic impedance becomes smaller than the resistor 126 resistance, resistor 126 dissipates more and more of the circuit 136 power. When the winding impedance is one-half the resistance of resistor 126, the power dissipation is equally shared by transistors 120, 122 and resistor 126. When a winding has zero impedance, practically all the 60 volts from power supply 35 appears across circuit 136 and resistor 126 dissipates practically all the power dissipated in the power gate.

The diversion of current from transistors 120, 122 to load resistor 126 at increasing voltage amplitudes across current switch and dissipation circuit 136 is now described. Upon initial turn on with very low winding current flowing over line 71 both transistors 120 and 122 are at collector current saturation. As current increases a small amount, it is passed by transistor 122 through the base-emitter junction of transistor 124. Both transistors 120 and 122 remain at collector current saturation until the current supplied over line 71 reaches a maximum limiting amplitude, such as 3 amperes. Such current limit is determined by the current sensing amplifier 115 as above described. As the winding load increases, i.e., the winding dynamic impedance is decreasing, the voltage on line 71 decreases. This change results in a voltage increase across transistor 122. Transistor 124 remains at collector current saturation. Since transistor 124 is at collector current saturation, such transistor will not absorb an increased voltage thereacross. Therefore, for voltage increases across circuit 136, there is a corresponding voltage increase across resistor 126. Then, even though the voltage drop across dissipation circuit 136 increases there is no corresponding increase in current amplitude because of the limiting action of current sensing amplifier 15. Therefore, as the voltage on line 71 decreases (there is a resulting increase in voltage drop across and current flow through resistor 126), the limited amplitude current is diverted from transistor 122 to resistor 126. This diversion shifts power dissipation from transistor 122 to resistor 126.

When the voltage on line 71 is zero, transistor 122 is passing only sufficient current to cause transistor 124 to be current conductive. For the illustrated configuration it is typically 100 milliamperes of base current. Transistor 124 is still at collector current saturation supplying the three ampere current through resistor 126. At this operating point, transistors 120 and 122 are no longer at collector current saturation.

The maximum power dissipation of a typical transistor utilized for transistor 124, such as a Motorola 2N3792, is about two or three watts. Since this transistor has a high power rating the three watt power dissipation is considered neglible for the three ampere current flow therethrough. The power dissipation in transistor 122 is at maximum when the voltage on line 71 is one-half the voltage on line 34. This corresponds to the dynamic load impedance of the winding being equal to one-half the resistance of resistor 126. At this time resistor 126 has a current flow of 1.5 amperes with a current flow of substantially 1.5 amperes through transistor 122. There is a 45 watt power dissipation in resistor 126 as well as in transistor 122. While this power dissipation for transistor 122, such as in a Motorola 2N3792, is not difficult, of greater significance is that the power dissipation is at a voltage low enough to not cause secondary breakdown. Such lower voltage permits the selection of a transistor costing less than another transistor type capable of sustaining the same power dissipation at a higher voltage amplitude.

STEPPING MOTOR CONTROL CIRCUITS

Since stepping motor control circuits 40 and 41 are identical only control circuit 40 is described with respect to FIG. 2 and motor 11. Further in control circuit 40 the two drive circuits 60 and 61 are identical, therefore, drive circuit 60 is described in detail. Drive circuit 60 actuates the center tapped winding 46 while drive circuit 61 actuates center tapped winding 47 in a particular sequence to cause stepper motor 11 to rotate either in a clockwise or counterclockwise direction, as will be described. Drive circuits 60 and 61 receive actuating signals respectively over signal paths 62 and 63 and signal paths 64 and 65.

Drive circuit 60 has a pair of semiconductor switching devices 68 and 70, shown as transistors, having their collectors respectively connected to opposing ends of stepping motor winding 46. It is understood that winding 46 may be two separate windings, each having one end joined at the illustrated center tap connection. The center tap connection of winding 46 is connected to line 71 which carries the gated +60 v. from power gate 32. Signal paths 62 and 63 are coupled to the base electrodes of switching devices 68 and 70 through control transistors 72 and 73. The arrangement is such that whenever a transistor actuating signal is supplied over signal path 62, a corresponding transistor deactuating signal is supplied over signal path 63, and vice versa. In this manner, one and only one of the semiconductor switching devices 68 and 70 is conductive at a given time, and also when one is switched to nonconduction, the other is switched to current conduction. A later described flip-flop is used to supply such actuating and deactuating signals. It is understood other central arrangements may be provided as both devices 72 and 73 are off or at current nonconduction at the same time.

In the illustrated embodiment, a relatively negative or low voltage supplied over signal path 62 causes control transistor 72 to become current conductive, thereby supplying base drive to semiconductive switching device 68 making it highly conductive. Simultaneously therewith, a relatively positive voltage is supplied over signal path 63 to control transistor 73 making it nonconductive to remove the base drive current from semiconductor switching device 70, thereby making it electrically nonconductive. With this arrangement, current will flow from line 71 to the center tap connection of winding 46, thence in one of two directions as determined by the conductivities of the semiconductor switching devices 68 and 70 to selectively provide a magnetic field in stepping motor 11 of a given polarity.

By repetitively changing the signals on signal paths 62 through 65 inclusive and thereby successively moving the magnetic field in stepper motor 11 with respect to the permanent magnet rotor, repetitive stepping operations are effected in either the clockwise or counterclockwise direction.

When the stepping motor 11 has reached a desired position, power gate 32 is closed, removing the gated +60 v. signal from line 71.

It is desired to have a magnetic field produced by windings 46 and 47 to be continued to ensure that the rotor of stepping motor 11 precisely maintains itself in the desired position. To this end, a +5 v. potential is supplied over line 75 to both stepping motor control circuits 40 and 41. The +5 v. also serves as a power supply voltage for the control transistors 72 and 73. The motor position holding current is supplied to the windings 46 and 47 through current limiting resistor 76. Diode 77 is electrically interposed between the centre tap connections of windings 46 and 47 (as well as line 71) and resistor 76. The diode or unidirectional current conducting device 77 is poled such as to conduct current between the supply line 75 and the winding 46 only when the potential on line 71 has been removed, i.e., is less positive than the line 75 +5 v. At other times, diode 77 is reverse biased to isolate the higher voltage potential (+60 v.) on line 71 used in stepping the motor 11 from reaching the +5 v. supplied over line 75. This arrangement greatly reduces the power dissipation in stepping motor 11 while it is not being stepped. It is understood that the +60 v. on line 71 could be left to provide a holding field in motor 11. However, large current amplitudes are involved which, of course, means power loss within the motor causing it to heat up. By supplying a relatively low voltage, such as +5 v., over line 75 limited by resistor 76 to the windings 46 and 47, sufficient magnetic fields are generated to keep stepping motor 11 accurately maintained in a desired position. When it is again desired to cause the stepper motor to move to a new position, the power gate 32 is again enabled to supply the gated +60 v. to the center tap connections of the stepping motor windings, thereby again reverse biasing the unidirectional current conducting device 77.

During the repetitive stepping operations, while stepping motor 11 is moving toward a desired position, the semiconductor switching devices 58 and 70 are repetitively switched between high current conduction and current nonconduction.

When one of the switching devices, for example switching device 68, is changed from current conduction to current nonconduction, the current flowing in the motor winding tends to persist due to inductance. If there were a low resistance path for this current, the flow and the magnetic field induced would persist for a relatively long time. Because the switching transistor 68 has changed to nonconduction there is no low resistance path and the voltage at the collector of switching device 68 rises rapidly seeking a dissipation path. At the same time the opposite end of the center tapped motor winding is going negative. If diode 81 were not in the circuit a path for conduction would be found through current conducting switching device 70. The negative going excursion would be amplitude limited and likewise the positive going excursion of the collector of switching device 68. However, with diode 81 in the circuit there is no conduction path found by the negative excursion of the diode 81 and of the motor winding. Thus the diode 80 end can continue to rise in voltage. At about +400 volts the collector-base diode of switching device 68 undergoes Zener breakdown and the stored magnetic energy rapidly dissipates through that path as electrical current. Because the stored energy in the inductance is dissipated at high voltage, it decays in a relatively short time. The limit to the voltage swing in winding 46 is determined by the collector-to-emitter breakdown voltage ($V_{CE}$) of the semiconductor switching devices 68 and 70. By making this value of the breakdown voltage high, the reverse voltage is across both the diodes 80, 81 and transistors 68, 70 at each respective end of winding 46. The stored energy in the winding inductance is permitted to be dissipated quickly through the Zener breakdown of those switching devices.

PROGRAM CONTROL 14

On-off switch 37 of FIG. 1 being closed, power is supplied to all units. The illustrated system is started by closing start switch 160 of FIG. 4. This switch closure supplies start signal 168 (FIG. 6) resetting all flip-flops, counters and other memory types of devices. All devices are then reset to a cleared or reference state. The resetting of flip-flops and counters is well known and will not be further described for that reason, it being sufficient to state that it is desired to initiate operation of the system at a particular reference state. The start signal 168 is also supplied to utilization means 10 for indicating thereto that operations are to commence. Utilization means 10 then, when ready to commence operations, as indicated by known condition responsive devices, supplies ready signal 169 over line 13, thence through amplifiers 161 and 162 to set proceed flip-flop 163. As seen in FIG. 6, this action can be practically simultaneous with the start signal. Proceed flip-flop 163 then indicates that positioning movements are to be effected by program control 14 by supplying a positive potential over line 164. This positive signal reverse biases diode 164A permitting capacitor 165C to be more positively charged from voltage V on line 38. Circuit 165 provides a signal delay such that AND gates 166 and 167 are opened to pass the Index X and Y signals a predetermined time after the ready signal 169 is received. The delay permits the transmission of control signals over lines 200, 201, 17 and 18 simultaneously with ready signal 168. Such delay permits program control 14 to establish its operating conditions indicated by the other control signals before initiating movements in response to ready signal 168.

Simultaneously, or prior to the supplying of ready signal 168 on line 13, the move X and move Y signals were supplied over lines 17 and 18 to respectively set the X and Y flip-flops 170 and 171. Such signals respectively indicate that positioning movements are necessary in the X and Y directions. The X and Y flip-flops 170 and 171, when set, respectively supply AND gate enabling signals 177 and 178 over lines 172 and 173 to enable AND gates 166 and 167 to pass the delayed proceed signal from proceed flip-flop 163. Therefore, if no Y movements are desired, flip-flop 171 remains reset such that no gate enabling or opening signals are supplied over line 173 thereby blocking the proceed signal. The move X signal 177 on line 172 is supplied through delay network 176 to AND gate 167. The purpose of delay network 176 is to permit the Y movement to be initiated prior to any X movements such that the Y movements may be completed prior to the completion of the X movements. This is not a necessary arrangement to practice the present invention, but arose out of arbitrary and particular requirements of the first constructed embodiment of the present invention.

Assuming that both the AND gates 166 and 167 are enabled by the signals 177 and 178, resistance-capacitive differentiators 180 differentiate the output signals from AND gates 166 and 167 to provide index X and Y pulses 210 and 211 respectively over lines 175 and 181. These pulses are supplied respectively to the X stepping motor program control 183 and the Y stepping motor program control 184 for initiating operations in the two motor program controls which effect the movements of the motors 11 and 12.

The first function performed subsequent to actuation of controls 183 and 184 by the index pulses is to supply the X enable signal over line 30 and the Y enable signal over line 31 respectively to power gates 32 and 33 (FIGS. 1 and 3). The gates +60 v. is then supplied over lines 71 and 185 to the FIG. 2 illustrated stepping motor controls 40 and 41. Upon the gated +60 v. being supplied to the two stepping motor controls 40 and 41, the motors are ready to respond to stepping pulses for making the positioning movements.

After supplying the enable signals, an oscillator, later described, in each of the motor program controls 183 and 184 is actuated to generate stepping pulses which actuate the respective drive circuits for the motor windings. The motor program controls 183 and 184 each have counters counting the number of stepping pulses. Upon a predetermined number of pulses indicated at the inputs 188 and 189, stop signals are supplied respectively over lines 190 and 191. In the first constructed embodiment, the Y stepping motor program control could complete its positioning movements prior to the completion of the X stepping motor program positioning movements. Therefore, Y stop signal 194 on line 191 would be first supplied to AND gate 192. AND gate 192 is not completely enabled until the X positioning movements have been completed as indicated by the signal 193 going negative at the completion of the positioning movements. At such occurrence, both signal 194 on line 191 and signal 193 are relatively negative to enable the AND gate 192 to supply a negative signal over line 195 indicating that all positioning movements have been completed. Line 195 supplies such signal over line 56 to utilization means indicating that a function can be performed since the apparatus is now at a newly desired position.

In addition to communicating that the new position has been reached, X stop signal 193 is further supplied over line 196 to reset flip-flop 170, thereby disabling AND gate 167 preventing a reinitiation of X positioning movements. The motor program control 183 stops the X coordinate motor 11. The Y stop signal is also supplied over line 197 to reset flip-flop 171 which in turn disables AND gate 166 thereby preventing reinitiation of Y movements. The movement's completed signal on line 195 is further supplied over line 198 for resetting the proceed flip-flop 163. This action, after a time delay provided by circuit 165, disables both gates 166 and 167 in preparation for a new positioning movement. In other words, the move X and move Y signals on lines 17 and 18 could set the flip-flops 170 and 171, respectively, prior to the initiation of positioning movements. Proceed flip-flop 163 is then utilized as a synchronizing flip-flop between utilization means 10 and the positioning controls effected by the motor program controls 183 and 184.

As is usual in digitally controlled devices, facilities are provided for manually stepping the operation. To this end manual switch 200 is connected to the set input of proceed flip-flop 163. Grounding the set input sets the flip-flop. It is understood that similar manual switches are connected to the other flip-flops as well as to other controls to effect stepping the system through its sequences in a manual basis. Since such stepping is not a part of the present invention, it will not be further described but is mentioned because this is a usual procedure for maintenance of such equipment.

In a typical operation involving repetitive positioning movements in the X direction, utilization means 10 is responsive to the movement's completed signal on line 56 to perform its function. Upon the completion of the function, such as a fabrication step or the like, a ready signal is again supplied over line 13 to reinitiate another positioning movement. In response thereto, the flip-flops 163, 170 and the other circuitry actuate the X stepping motor program control 183 to perform a positioning movement in X direction in accordance with the program input on line 188. In some instances, the successive movements will be identical. In such a case, the program input on line 188 is manually preset prior to initiation of the operation. Upon completion of each movement, a signal is supplied over lines 190, 195 and 56 to inform utilization means 10 that the new movement has been completed whereupon the cycle is repeated until all of the positioning movements in a sequence of operation is completed at which time the on-off switch 37 may be opened automatically or manually. The means for performing automatic shutdown is not a part of this invention and will not be further described.

Utilization means 10 may further include edge sensors (not shown), such as pressure responsive transducers, indicating that a work member has moved toward a work piece and has mixed it, indicating that it has passed by the edge. Such devices are known and not described herein. Therefore, it is desired that the stepping motors reverse their direction such that further successive work performing functions can be completed. To this end, reverse motor direction signals are supplied over lines 200 and 201 respectively to the X motor program control 183 and the Y motor program control 184. Such signals cause the program control to reverse the direction of the motors by altering the sequencing of signals over cables 50 and 51 as will be described.

X STEPPING MOTOR PROGRAM CONTROL—
(FIGS. 5 AND 6)

Since the X motor program control 183 and the Y motor program control 184 can be constructed to be identical, only the X motor program control 183 is described in detail. Variations of the motor program control will be discussed briefly at the end of this section.

The index X and index Y signals 210 and 211 are received respectively by the two motor program controls. Control circuitry in these motor program controls are responsive to the index signal to initiate operation of a stepping pulse generator, such as generator 212 (FIG. 5). Generator 212 supplies stepping pulses 213 in accordance with a preprogrammed schedule. The first few pulses 213A have a relatively low repetitive frequency, such as 500 p.p.s. (pulses per second). These relatively low frequency pulses have an increasing repetitive frequency to cause the stepper motor to accelerate to a predetermined maximum speed. Upon reaching that speed, which is limited by the characteristics of the stepper motor and the load being driven by the motor, the frequency of the pulses is maintained at a higher repetitive frequency as indicated by pulses 213B. Such a pulse repetitive frequency may be 3,000 pulses per second. Then, upon approaching a desired new position, the high rate of operation of the motor could overshoot the desired new position. Therefore, a predetermined number of stepping pulses prior to the positioning mechanism reaching its desired position, the pulse rate is again slowed to the 500 pulses per second rate as indicated by the pulses 213C. The motor is stopped accurately at the new position at the occurrence of pulse 213D. Simultaneously with pulse 213D, X stop signal 193 on line 190 is made relatively negative to indicate the X positioner has reached the desired new position.

The variation in stepping pulse frequencies is designed to minimize transit time in the positioning movement as well as to prevent overshoot of the positioning mechanism when approaching the desired new position. The motor program control determines the distance traveled by the positioning mechanism by counting the stepping pulses, each stepping pulse corresponds to a predetermined movement of the positioning mechanism. In a first embodiment, each stepping pulse caused the motor to move the positioning mechanism 0.0005 inch. The motor was coupled to the positioning mechanism by a helical screw of known design with a direct connection between the motor rotor and the screw to ensure no slippage. In this manner, each stepping pulses accurately and precisely represented the movement of the rotor and the driver positioning mechanism (not shown).

The X positioning movement is initiated in control 183 when the index X signal 210 on line 181 sets flip-flops 214 and 215. Flip-flop 214 is termed the I flip-flop for index and supplies the X enable signal over line 30 to FIG. 3 for opening the power gate 32 which supplies the gated +60 v. to motor control circuit 40. The X enable signal on line 30 is represented by the state of the flip-flop 214 indicated in FIG. 6 by numeral 216. Power gate 32, being a fast responsive gate, immediately supplies the gated +60 v. to motor control 40. The motor is now ready to be stepped.

The flip-flop 214 supplies its I signal 216 through differentiator circuit 217 to reset divide-by-two flip-flop 218 and clear decade counters 219 and 220. This action prepares the counters for programming the X positioning movement. The direction of the movement has already been determined by the signal on line 200 which is connected to the toggle input of flip-flop 221. Flip-flop 221 supplies C and C̄ signals respectively over lines 222 and 223 to indicate which direction the motor is to be rotated, i.e., clockwise (CW) or counterclockwise (CCW). The switches 224 and 225 schematically represent the presetting of flip-flop 221 as may be desired when the machine is started. Flip-flop 221 may also supply signals to utilization means 10 to indicate which direction the motor is being rotated. In such an instance, the utilization means could be responsive to make a comparison of the desired direction of rotation and thereby determine whether or not a signal should be supplied over 200 to reverse the state of flip-flop 221. Such connections and functions are not illustrated in this specification or drawing as they form no part of the present invention. It is pointed out that such features can be included in apparatus utilizing the present invention. In any event, the direction of rotation of the stepping motors is predetermined and stored in flip-flop 221.

Stepping pulse generator 212 generates stepping pulses 213 in response to a negative signal on line 226 which is the complement or inverse of I flip-flop or X enable signal 216 found on line 30. The relatively negative signal on line 226 reverse biases diode 227 to make transistor 228 nonconductive. Prior to this time, transistor 228 had been conductive and clamped the voltage across capacitor 229 to ground reference potential. In this manner, the oscillator including unijunction transistor 230 is deactuated. Upon transistor 228 becoming nonconductive, capacitor 229 is charged through resistor 231 at a rate determined by the RC time constant. Upon reaching the threshold voltage of unijunction transistor 230, capacitor 229 is discharged rapidly therethrough to form a stepping pulse 213 of short duration on line 232. The charge cycle is then repeated to generate a succession of pulses having a repetitive frequency determined by the circuit time constant. These pulses are amplified by amplifier 233 and supplied over line 234 to various units within X motor program control each for effecting a one-step operation of motor 11 and to record such one-step operations within the counters 218, 219 and 220. Typical pulse repetitive frequencies are between 500 p.p.s. and 3000 p.p.s., no limitation thereto intended. The repetitive frequency of stepping pulses 213 is increased by making transistor 242 conductive to provide an additional charging path for capacitor 229. Initially transistor 242 is nonconductive such that capacitor 229 is charged via resistor 231 with a relatively long time constant, i.e., one that yields 500 p.p.s., for example. As transistor 242 is made conductive, an additional charging path is provided through resistor 243 to increase the repetitive frequency for accelerating the motor.

To increase the motor speed by making transistor 242 conductive, the index X pulse 210 on line 181 sets high speed or flip-flop 215 which supplies signal 215A over line 241. Capacitor 240C in network 240 is charged in accordance with the acceleration characteristics of motor 11. Signal 215A reverse biases diode 240A to permit capacitor 240C to be charged from voltage V. The voltage across capacitor 240C determines the bias to the base electrode of transistor 242. As the capacitor 240C charge increases, the transistor 242 increases its conductivity thereby decreasing the RC time constant of charging capacitor 229. In the particular illustrated embodiment, four stepping pulse periods between the stepping pulses 213 were required to bring motor 11 up to desired speed. In other situations, the number of pulses could be substantially different. At the end of four stepping pulse periods, transistor 242 is fully conductive causing the maximum rate of stepping operations. The time constant of the oscillator circuit has been changed to the RC time constant of resistors 231 and 243 being in parallel circuit relation to capacitor 229. For each pulse in the train of pulses 213, the motor 11 moves an identical distance, i.e., 0.005 inch.

To decelerate the motor, flip-flop 215 is reset by a decelerate signal received over line 244 generated by the counters and their associated decoding networks as will be described. Flip-flop 215 whe nreset makes transistor 242 nonconductive by discharging capacitor 240C through diode 240A, thereby slowing the charging rate of capacitor 229 and the pulse repetitive frequency of stepping pulses 13.

The programming of a number of steps is first described. The first counter is divide-by-two flip-flop 218; Motorola type MC845, for example, connected as a modulo-two counter. Such connections are well known for flip-flops. This arrangement means that fo reach pulse received on the toggle input enumerated by the letter T, the flip-flop will change state; in response to two successively received pulses, it changes state twice to provide a negative going transient and a positive going transient once for each two input pulses. By defining the negative going transient as an output signal, it is seen that for each onutput pulse there must be provided two iput pulses. The output signal on line 250 from flap-flop 218 is shown as waveform 251. Each transition in waveform 251 corresponds to the emission of an X stepping pulse 213 in the line immediately above. It is remembered that the signal passed through differentiator 217 had previously reset divide-by-two flip-flop 18. Upon receipt of the first stepping pulse 213A, flip-flop 218 is set. The second pulse resets flip-flop 218 providing the first negative going transient and causing the unit's decade counter 219 to have a count equal to decimal 1. The fourth received stepping pulse causes the second pulse to be emitted over line 215, causing the unit's decade counter 219 to have a mount of decimal 2 and so forth through the modulus of the unit's decade counter 219. The frequency responsiveness of the counters is much higher than the maximum stepping frequency of the motor 11, therefore, they can operate either at the low speed or high speed without difficulty.

The purpose of having the divide-by-two flip-flop 218 is that it is more convenient for an operator to set distance to be moved in mils rather than in one-half mils. Therefore, each negative transition on line 250 represents a positioning movement of 0.001 inch for the motor and the count in the unit's decade counter 219 indicates the movement of the opsitioning mechanism in thousandths of an inch.

For illustrative purposes only, the operation of X motor control is being described for a movement of 0.020 inch. Accordingly, the two slide switches 251 and 252 are set to two and zero respectively. The setting of these switches constitutes the program input on line 55 of FIG. 1 and on line 188 of FIG. 4. These switches are connected through decoders 253 respectively to the unit's and tens' decade counters 219 and 220. The decoders 253 receive the binary signals from the decade counters 219 and 220 on lines 260 through 267 and translates such binary signals into a corresponding decimal representation supplied to the terminals zero to nine of the two slide switches 251 and 252.

The unit's and tens' decade counters are integrated circuits and each are assembled into a machine as one unit. As an example, the Motorola integrated decade counter type MC838 was used in one embodiment. Such decade counter has four counter type flip-flops and interconnections such that the counts decimal zero through line are effected. The remaining modulus of the counter, i.e., 10 through 15, are not permitted. In these decade counters the term Q1 represents the least significant flip-flop stage, Q2 the next significant, Q3 the next and Q4 the most significant. In binary representation, Q1 represents the digit $2^0$, Q2—$2^1$, Q3—$2^2$ and Q4—$2^3$. The logic of decoding the decade counters is set forth in Table I below:

TABLE I.—MC838 COUNTING LOGIC COUNTER STAGE SIGNAL STATE, BINARY 0 OR 1

| State | Q1 ($2^0$) | Q2 ($2^1$) | Q3 ($2^2$) | Q4 ($2^3$) |
|---|---|---|---|---|
| Decimal: | | | | |
| 0 | 0 | 0 | 0 | 0 |
| 1 | 1 | 0 | 0 | 0 |
| 2 | 0 | 1 | 0 | *0 |
| 3 | 1 | 1 | 0 | *0 |
| 4 | 0 | 0 | 1 | *0 |
| 5 | 1 | 0 | 1 | *0 |
| 6 | 0 | 1 | 1 | *0 |
| 7 | 1 | 1 | 1 | *0 |
| 8 | 0 | *0 | *0 | 1 |
| 9 | 1 | *0 | *0 | 1 |

*Stage signal state not necessary to unambiguous count indication.

The count of the unit's decade counter with respect to the divide-by-two flip-flop 251 and stepping pulses 213 is best seen in FIG. 6. For a count of 20, the unit's decade counter 219 cycles through two counts. The Q4 signal (positive when Q4=1) on line 263 is supplied over line 268 as an input to tens' decade counter 220. The signal on line 268 is transferred whenever the Q4 flip-flop of the unit's decade counter 219 goes from relatively negative (as by a differentiator, not shown) such that counter 220 counts to one as the unit's decade counter 219 is reset to all zeros, i.e., all flip-flops therein are reset. When the positioning movement in the X direction is greater than 100 mils, the Q4 signal on line 267 of counter 220 may be supplied over line 269 to other counters, such as hundreds' decade counter (not shown).

It was stated earlier that the high frequency of pulses 213B was changed to a lower frequency indicated by pulses 213C as the positioning mechanism approached the desired position. To this end, decelerate control circuit 270 is provided. Deceleration is initiated by a relatively negative signal on line 274. Junction 289 is connected to the deceleration portions of switches 251 and 252 and acts as an AND gate, that is, junction 289 has a positive signal at all times except when a negative signal is supplied by all connections of switches 251 and 252 at which time a negative signal is supplied. Decelerate circuit 270 includes diode decoders and a set of switch contacts on the switches 251 and 252. For simplicity, the ten contacts on switch 251 in decelerate circuit 270 are shorted together and shown as a single pole double-throw switch 215A. It is understood that the terminal 271 is actually five terminals labeled zero through four shorted together, while terminal 272 is five terminals labeled five through nine shorted together. The purpose of this connection is to simplify the circuit and reduce cost. A first AND gate 273 receives the Q2 and Q3 outputs from units counter 219. This corresponds to a count of six. Since it is desired to indicate deceleration by a relatively low or negative signal over line 274 to reset flip-flop 215, NOT circuit or an electronic inverting amplifier 275 is interposed between AND circuit 273 and switch terminal 271 to indicate that decade counter 219 has reached a count of six by a relatively low or negative signal. Similarly, AND gate 276 is connected to the Q1 and Q4 lines 260 and 263 carrying positive signals to indicate decimal 8. Decimal 8 signal from AND gate 276 in turn is supplied through signal n-version circuit 277 to switch terminal 272. In accordance therewith, when the unit's digit of the program distance is zero through four, a decelerate signal will be supplied when the counter reaches six. However, when the unit's digit is five through nine, the decelerate signal will be furnished when the unit's digit is equal to eght. The sgnfi nished when the unit's digit is equal to eight. The significance of this configuration with respect to the total count will become apparent in the consideration of the decelerate decoder portion for the tens' decade counter 220.

The decoder for the tens' decade counter deceleration control is such that deceleration signal is supplied at the tens' count which is one less than the desired new position count, that is, when the tens' unit of the preprogrammed count is two as in twenty, a deceleration signal is supplied by the tens' counter when it reaches numeral one. Therefore, in the particular illustration, the deceleration signal for the ultimate destination of 20 mils will be supplied when the count 16 is in the counters 219 and 220. Therefore, there are eight pulses 213C to permit the motor 11 to decelerate to 500 p.p.s. such that at the desired new position there is no overshoot. If the desired count had been 25, then switch 251A would have been set to terminal 272. Deceleration then would have occurred at count 18, fourteen stepping pulses before the desired position is reached. Fourteen stepping pulses corresponds to a movement of a 0.007 inch. In the particular embodiment, the minimum movement for deceleration happened to be 0.004 inch (8 pulses). For cost reduction, the deceleration period was varied because the elapsed time for reaching an absolute minimum transit time, i.e., for all possible counts was not necessary. It is understood that minimum transit time can be provided within the spirit of the present invention by expanding the unit's decoder to decode all counts such that a decelerate signal is supplied at 0.004 inch from the new position.

In the tens' portion of the deceleration control circuit the tens' decade signals Q1, Q2, Q3 and Q4 on lines 264–267 are inverted by circuits 284–287 and then applied by AND gates 280, 281, 282 and 283. The AND gates 280 and 283 are diode AND gates such that a relatively negative signal on both inputs is required before a low or relatively negative signal is supplied as an output signal. Such diode constructed AND gates are well known and will not be further described. Carrying out the deceleration decoding, the terminal $2^1$ receives its actuating signal from the Q1 output line 264 corresponding to a count of one in the tens' decade counter. Terminal $3^1$ is connected to line 265 for receiving the indication of a count of two. Terminal $4^1$ of switch 252 is connected to AND gate 280 which is actuated at the count of three. Terminal $6^1$ is connected to AND gate 281 which is actuated by a count of five. Terminal $7^1$ is connected to AND gate 283 which is actuated by a count of six while terminal $8^1$ is connected to AND gate 283 which is actuated by a count of seven. Terminal $9^1$ is connected only to the Q4 line 267 through inverting amplifier 287. This corresponds to a count of eight as seen in Table I. From the description, it is seen that the deceleration period is indicated by a relatively low voltage on line 274 at least 0.004 inch from the desired position. Line 288 indicates that the junction 289 is not only connected to the switch terminal 290 and 291 respectively from the unit's and tens' portion of the decoder of the deceleration control but also is connected to the hundreds' decade counter (not shown) and to any other counter used to keep track or tally the stepping pulses 213. The number of counters and the size of movements has no relationship to detection techniques as disclosed herein.

The flip-flop 218, in combination with switch 293, permits the indexing of the X–Y positioner to one-half mil. If the switch is set to zero, the positioning mechanism will position to a thousandth of an inch from its previous position. However, when the switch 293 is set to the contact 0.5 it will position to a one-half thousandths. In other words, the distance moved for each index X pulse signal on line 181 would be one-half mil plus the settings of switches 251 and 252 in mils.

As shown, the X stop signal 193 on line 190 is a relatively low or negative signal thereon. Line 190 is connected to the output terminal 294 of switch 293, terminal 295 of switch 251 and terminal 296 of switch 252. When all three terminals are conducting a voltage of relatively negative or low amplitude, and X stop signal is supplied over line 190. If any one of the terminals has a relatively high or positive signal, the signal on line 190 is accordingly high or positive. Therefore, the junction 297 connected to line 190 and the terminals 294 through 296 act as a logic AND gate. It is understood that isolation diodes are inserted to prevent sneak paths from the decoders 253 in line 250 for example. The X stop signal is also supplied over line 298 to reset flip-flop 214 thereby causing transistor 228 to become conductvie for preventing the generation of additional stepping pulses. This action stops motor 11.

The stepping of motor 11 is under the control of the winding sequence logic circuit 300 as it selectively toggles the A and B flip-flops 301 and 302. As these flip-flops are toggled, the signal paths of cable 50 are alternated between high and low to thereby control the two switches in each of the drive circuits 60 and 61 (FIG. 2). In this manner, the current flowing through the motor windings 46 and 47 are selectively and repetitively reversed in a predetermined sequence such that the stepping motor 11 rotates either clockwise or counterclockwise. Flip-flop 221 supplies its set signal identified as CW on line 222 to AND gate 303, while the reset signal is supplied.

What is claimed is:
1. A control system for an X–Y positioner having first and second stepping motors each with at least two windings each having first and second ends for connection to a motor stepping control circuit and said positioner having signal generating means indicating that a positioning movement is desired,
   the improvement including the combination,
   first and second stepping motor control circuits connected to the windings of said stepping motors respectively and each stepping motor control circuit including plural switching devices respectively connected to said ends of said windings,
   control means for selectively causing said plural switching devices in said stepping motor control circuits to be alternatively current conductive for successively actuating said windings by supplying current thereto in selected sequences for causing counterclockwise or clockwise motor stepping,
   a high voltage input means connected to said stepping motor control circuit for supplying a high voltage and current to such stepping motor control circuits, said stepping motor control circuits selectively connecting said high voltage input means to said winding ends thereby supplying high voltage and current thereto for actuating the motor in accordance therewith, a low voltage input means including unidirectional current conducting means connected to one end of each of said windings and poled to oppose current flow with respect to said high voltage input means, said low voltage input means supplying holding current through said unidirectional current means to said stepping motor windings whenever said high voltage input means is not supplying high voltage for stepping said stepping motor, power supply means connected respectively to said input means for supplying voltages thereto, gating means electrically interposed between said high voltage terminal and said power supply means, program control means connected to said gate means and said stepping motor control circuits for selectively actuating same in accordance with a predetermined program, said program control means including memory means containing indicia indicative of desired positional movements to be effected by said stepping motor, means in said program control means for tracking any position movements, comparison means for comparing tracked movements and said desired positional movement indicia and supplying an indicating signal when a given desired movement is equal to a given tracked movement and supplying a second signal when the tracked movement approaches a desired position, start means in said program control means, oscillator means in said program control means for supplying stepping pulses of a first rate to said stepping motor control and including gating means under control of said comparison means for selectively supplying said pulses to said stepping motors respectively in accordance with said comparison, one comparison means in each stepping motor control circuit for effecting independent positioning movement by each of said motors, delay means connected to said start means for delaying a start signal a predetermined time, accelerating means receiving said delayed start signal and operatively connected to said oscillator means for causing said oscillator to increase the frequency of said stepping pulses to a rate substantially higher than the initial rate, said accelerating means being connected to said comparison means for receiving said second signal for causing said oscillator means to again resume supplying stepping pulses at reduced rate prior to the arrival of the positioning means at a desired position.

2. The system of claim 1 wherein said program control means includes first and second stepping motor program controls, said oscillator means including separate pulse generating means in each said stepping motor program controls, each said pulse generator means being jointly responsive to said start means and said signal generating means indicating that a positioning movement is desired in the respective first and second stepping motor program controls to initiate generation of pulses at a first or slow rate, each said stepping motor program controls including said accelerating means operatively connected to said pulse generator means for causing said pulse generator means to increase the rate of stepping pulses and further responsive to said second signals respectively, to decrease the stepping pulse rate to thereby decrease the velocity of said stepping motors respectively.

3. The system of claim 2 further including winding sequence logic means in each said stepping motor program controls including means indicating direction of rotation of the respective stepping motors and receiving signals indicative of whether winding fields are opposing or aiding and jointly responsive to said signals opposing or aiding and said desired direction rotation to sequence winding actuation in accordance therewith.

4. X–Y positioning means including an X–Y positioner capable of supplying momentary ready, reverse X, reverse Y, move X and move Y signals indicative that positioning movements are desired in respective X and Y directions and respective to a movements completed signal to reinitiate a new momentary ready signal, together with a pair of stepping motors each having two center-tapped windings which are selectively actuable to step the motors in a counterclockwise or clockwise direction, a stepping motor control circuit connected to said windings of each stepping motor control respectively and each having switching means connected to opposite ends of the respective windings, said switching devices between switchable between current conduction and nonconduction for selectively causing current flow in opposing directions between said center-tap and the alternative ends of the respective windings and having a connection for supplying a high voltage and high current amplitude to said center-taps and a second current supply including unidirectional current conducting means connected to each center-tap and capable of supplying a low voltage low amplitude current for holding the stepping motor in a predetermined position, the improvement including the combination:

a power supply for supplying a low voltage to said unidirectional current conducting device and which are poled to oppose current flow with respect to the high voltage terminal such that the current flow is blocked through the respective unidirectional current conducting devices whenever high voltage is applied to the center-taps, respectively, and for supplying a high voltage high current to step said stepping motors, separate gating means interposed between said power supply means and each said center-taps for selectively passing high voltage and high current thereto, start means jointly responsive to said ready signal and said move X and said move Y signals to respectively supply index X and index Y signals indicating movements are to be commenced in the X and Y directions, a pair of stepping motor program controls respectively connected to said X and Y stepping control circuits for actuating in predetermined sequences said switching devices for controlling the direction and rate of stepping by the respective stepping motors, each said stepping motor program controls including initiate flip-flop means and high speed flip-flops means, both said flip-flop means being responsive to said respective index pulses to be set to an active condition, said initiate flip-flops when in said active condition supplying gate enabling signals to the respective gates for supplying said high voltage to the center-taps of the windings of the respective stepping motors, stepping pulse generator means in each said stepping motor program control and responsive to said initiate flip-flop being set to an active condition to cause generations of repetitive stepping pulses and including rate control means respectively connected to the high speed flip-flops and responsive thereto to alter the rate of pulse generation from the initial rate to a higher rate so long as said high speed flip-flop is set to an active condition, counter means in each said stepping motor program controls connected respectively to said pulse generating means for counting the pulses for counting the steps of the respective stepping motors and being responsive to said initiate flip-flop being set to the active condition to reset to a reference state, memory means in each said stepping motor program controls indicating the number of steps to be performed for each time said initiate flip-flop is set to an active condition, winding sequence logic circuit means in each of said stepping motor program controls, including direction of rotation indicating means, said direction of rotation indication means respectively receiving said reverse X and reverse Y signals and being responsive thereto to reverse the direction of rotation being indicated, a pair of winding current control means respectively connected to said switching devices for switching said switching devices between current conduction and nonconduction to thereby control the direction of current flow through said windings only one switching device connected to a given winding being current conductive at a given time, said winding current control means indicating direction of current flow for each winding, said winding sequence logic circuit means in each said stepping motor program control being jointly responsive to the respective direction of rotation indicating means and said indications of direction of current flow through the respective windings to initiate a predetermined sequence of current flow through said windings, said winding sequence circuit logic means receiving said stepping pulses from the respective stepping pulse generator for changing the direction of current flow each time a stepping pulse is received.

comparison means in each of said stepping motor controls jointly responsive to said counter means and said memory means in the respective stepping motor program controls to supply first and second comparison indicating signals, said first comparison indicating signals indicative that said counting means has counted a predetermined number of pulses different from the memory means indicated number of pulses indicating that the respective stepping motors should be decelerated and said second signal indicating that the respective stepping motor should be stopped, said first signal resetting said high speed flip-flop such that said pulse rate means in said stepping pulse generator respectively cause the stepping pulse generators to emit stepping pulses at a reduced repetitive frequency, and circuit means jointly responsive to said second signals from both said stepping motor program controls to supply a movement's complete signal to said XY positioner and to reset both said initiate flip-flop from said active condition to thereby stop further movements until at least a new ready signal is received.

References Cited

UNITED STATES PATENTS

| | | |
|---|---|---|
| 2,941,136 | 6/1960 | Marantett et al. |
| 3,414,785 | 12/1968 | Orahood et al. |
| 3,430,121 | 2/1969 | Yoshitake et al. |

BENJAMIN DOBECK, Primary Examiner

U.S. Cl. X.R.

318—28, 138